United States Patent [19]

Benmax

[11] E Re. 29,729

[45] Reissued Aug. 15, 1978

[54] BUTTONING MEANS

[76] Inventor: Peter David Benmax, 22 Mare St., London E.G., England

[21] Appl. No.: 776,449

[22] Filed: Mar. 10, 1977

Related U.S. Patent Documents

Reissue of:

[64] Patent No.: 3,942,224
Issued: Mar. 9, 1976
Appl. No.: 425,733
Filed: Dec. 18, 1973

[30] Foreign Application Priority Data

Jan. 9, 1973 [GB] United Kingdom ..... 1187/73

[51] Int. Cl.[2] ..... A44B 1/18

[52] U.S. Cl. ..... 24/90 B; 24/102 SL; 24/102 T; 24/90 E

[58] Field of Search ..... 24/90 B, 102 T, DIG. 1, 24/102 A, 102 E, 102 R, 90 E, 90 F, 91, 102 SL, 102 FC; 5/356

[56] References Cited

U.S. PATENT DOCUMENTS

| | | | |
|---|---|---|---|
| 654,430 | 7/1900 | Berger | 24/102 T |
| 1,444,701 | 2/1923 | Novak | 24/102 E |
| 1,686,235 | 10/1928 | Heasley | 24/DIG. 1 |
| 1,720,079 | 7/1929 | Kenlan | 24/102 SL |
| 2,013,528 | 9/1935 | Thiele | 24/102 T |
| 2,223,594 | 12/1940 | Bednarek | 5/356 |
| 3,608,157 | 9/1971 | Molt | 24/102 T |

*Primary Examiner*—Bernard A. Gelak
*Attorney, Agent, or Firm*—Edwin E. Greigg

[57] ABSTRACT

A buttoning means is provided having two parts, one of which holds a barbed member able to pierce the item to be buttoned and then to be restrained by the other part, the parts are tethered by a tethering means that was coiled in one or both of the parts prior to buttoning and is uncoiled when buttoning has been effected.

3 Claims, 5 Drawing Figures

BUTTONING MEANS

Matter enclosed in heavy brackets [ ] appears in the original patent but forms no part of this reissue specification; matter printed in italics indicates the additions made by reissue.

This invention relates to a buttoning means and a method of buttoning using said means.

It is well understood in the art of buttoning that a first button must be provided with a tethering thread and that this thread must be linked to a second button or similar restraining means so that the cushion or item to be buttoned may be buttoned or deep-buttoned depending upon the length of the tethering thread. This operation is usually performed with a needle. Improved buttoning methods are available however and these may employ a buttoning gun. Such a gun is described in the specification of my co-pending United Kingdom Patent Application Nos. 56396/72 and 56795/73. Notwithstanding the use of a buttoning gun there is still the need for the attachment of the tethering thread or loop to the restraining means and it is this step which is uneconomical of the time expended in the buttoning operation.

It is an object of my invention to provide a buttoning means and buttoning method in which the attachment of the tethering means is performed quickly and efficiently.

Accordingly I provide a buttoning means comprising a button, a barbed member adapted to pierce an item to be buttoned said barbed member being held by said button or part of said button, a restraining means for the reception of the barbed end of said barbed member and a coiled tethering means which uncoils and tethers the restraining means and the button via the barbed member when the barbed end of the barbed member enters the restraining means or a part thereof.

Accordingly, I provide a method of buttoning wherein a tethering means within a button is attached to or is to be attached to a barbed member held by a button, the barbed member being used to pierce an item such as a cushion to be buttoned and engage with a restraining means or a part thereof adapted to restrain the barbed member so that when engagement is effected spring-back forces generate in the item to be buttoned release and uncoil the said coiled tethering means from within said button and or said retaining means and buttoning is effected.

According to a further feature of my invention, I provide buttoning means in which a button has a detachable barbed member for piercing a cushion and is adapted to tether the button to the cushion when detached from the said button.

Preferably, the restraining means is a second button or the bottom of a button and the barbed member is a needle adapted to carry a cord like tethering means such as a thread, an umbilical cord, a web or an harness of threads, preferably all of nylon, within a hollow space of a first button.

The term 'coiled' is herein used to mean to gather or to lay up in such a manner as to prevent entanglement.

The invention will be more readily understood from the following description of three examples shown in the figures of the accompanying drawings in which.

Figure 1:
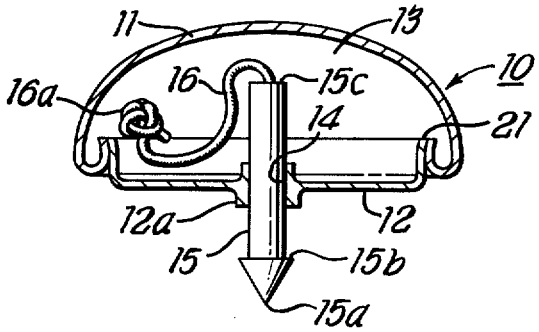
FIG. 1 is a sectional elevation of a button provided with a detachable barbed member or needle.

Referring now to FIG. 1, a hollow button shown generally at 10 has an upper part 11 and a base part 12 enclosing a hollow space 13. The base part 12 enclosing a hollow space 13. The base part 12 is provided with a centrally disposed aperture 14 adapted detachably to hold and retain a barbed member 15. The barbed member 15 has a pointed end 15a, an abutment or barb 15b and an end 15c remote from the said pointed end 15a, which end 15c may if desired have an eye, not shown, to which is attached a coiled tethering means in the form of an umbilical cord 16 of nylon or similar material which cord may be integral with the said barbed member 15. The umbilical cord 16 is knotted at 16a and coiled to any convenient length within the hollow space 13 of the button 10 depending upon the depth of the item, such as a cushion, to be buttoned and the type of loose or deep buttoning desired in the said item.

Figure 2:
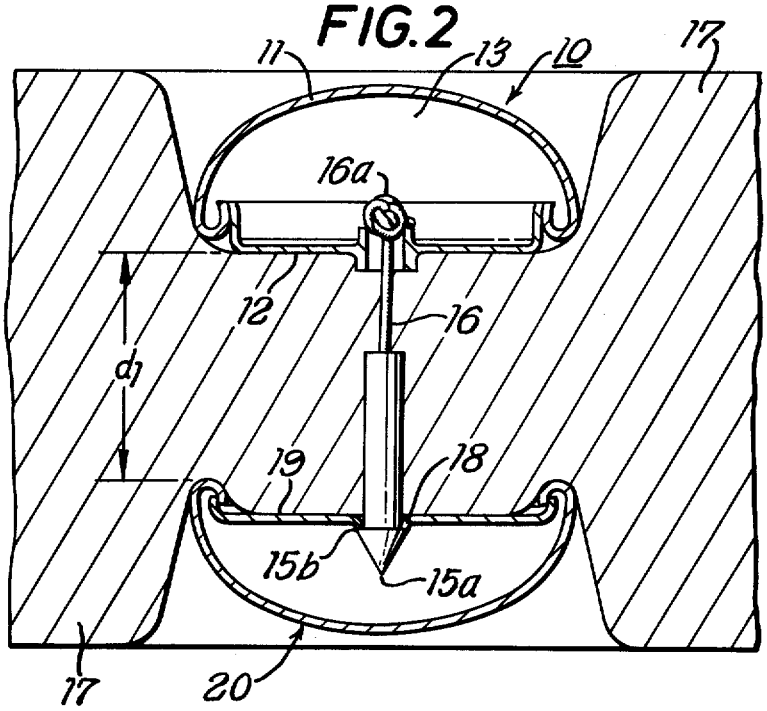
FIG. 2 is a sectional elevation showing the button of FIG. 1 after it has pierced a cushion and mated or engaged with a restraining means in the form of a second button.

Referring now to FIG. 2, the button 10 is pushed into and used to pierce an item such as a cushion 17 to be buttoned and the pointed end 15a of the barbed member 15 pierces the cushion 17. The abutment 15b of the barbed member 15 engages with a snap action circlip 18 in a base or bottom 19 of a restraining means in the form of a complementary button shown generally at 20. The barbed member 15 is now detached from aperture 14 by spring back forces generated from within the cushion as the cushion adopts its finished dimension $d_1$, which dimension is determined by the length of the uncoiled tethering means in the form of the umbilical cord 16. The knot at 16a is unable to pass through the aperture 14 and clearly the cushion 17 is now buttoned by the two buttons 10 and 20 which are tethered by means of the barbed member 15 and the umbilical cord 16. As shown, the barbed member 15 being integral with one another, the barbed member and the cord being made from nylon or a similar material.

As stated above, the button 10 comprises a base 12 having an aperture 14 which receives and holds the said needle or barbed member 15. The barbed member 15 is a press fit into aperture 14. The base 12 has a spring edge 21 adapted to receive the upper part 11 of the button which when in place (as shown) is sufficiently firmly secured to base 12 to allow the barbed member 15 to abut with it when the barbed member pierces the cushion or similar item to be buttoned.

Figure 3:
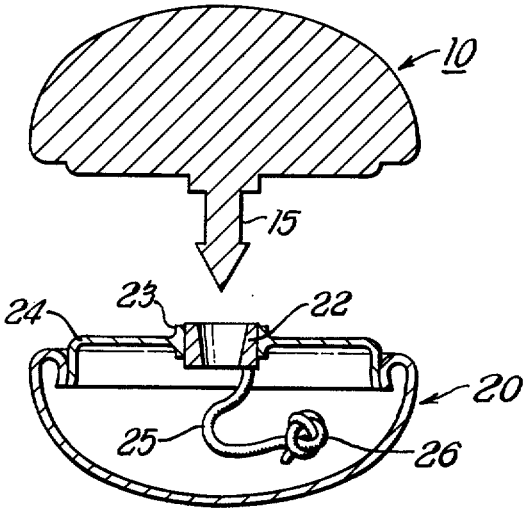
FIG. 3 is a sectional elevation of a buttoning means in which a first button holds an integral barbed member or needle and a mating second button is provided with a detachable restraining means tethered to it.

Referring now to FIG. 3 a buttoning means comprises the button 10 of FIG. 1 in which the needle 15 is integral with the button and arranged to mate, after penetration of the item to be buttoned, with a complementary button shown generally at 20. The barbed member 15 enters a restraining means 22 which is in the form of a collar held by a rim 23 on a base or bottom 24 of button 20. The collar 22 is provided with a coiled tethering means 25 in the form of an umbilical cord which is knotted at 26. Clearly, when the needle enters collar 22 it is restrained by it and collar 22 is able to free itself from the base 24 so that buttoning is effected in a similar manner to that shown in FIG. 2.

Figure 4:
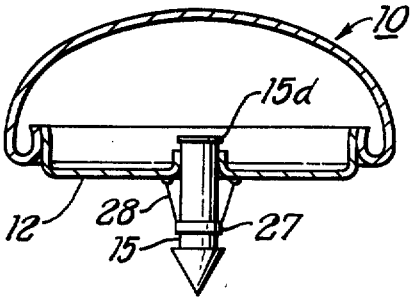
FIGS. 4, 4A show a button with a detachable barbed member or needle held by a tethering means in the form of a harness.
Figure 4A:
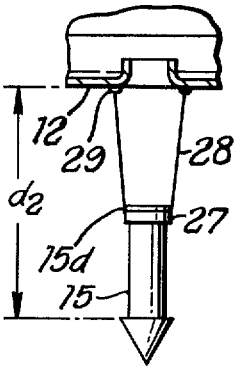

Referring now to FIGS. 4, 4A a tethering means in the form of a coiled and uncoiled (or closed and extended) harness of nylon cords is shown. The barbed member 15 is provided with a terminal rim 15d which abuts, when the barbed member is detached from the button 10, with a ring 27 which is attached to an harness 28 of nylon cords attached at 29 to the base 12 of the button 10. The length $d_2$ of the uncoiled harness may be made to take any length of buttoning as depicted for example by distance $d_1$ in FIG. 2.

Clearly a button with a detachable needle or barbed member and umbilical cord such as that shown in FIGS. 1 or 4 may be used to advantage with a complementary mating button such as the button shown at 20 in FIG. 3. In this way a long tethering means may be obtained by virtue of the two umbilical cords 16 and 25 (or the cord 16 and harness 28) combined to give a long length of $d_1$ (FIG. 2) when the item to be buttoned is exceptionally deep.

The shape of the button is unimportant provided where necessary it has a sufficient volume within itself to hold the coiled tethering means. Generally the button is circular in plan and domed in section but it may inter alia be elliptical, rectangular or polygonal in plan. It may further clearly be covered with any suitable covering material.

The restraining means is generally a button or a button bottom but it may be the needle or barbed member per se since the needle may be provided with an enlarged abutment 15b (FIG. 1).

Alternatively the needle may be provided at its end with pivoting barbs similar to that used in a harpoon, said barbs remaining closed during penetration of the cushion or item to be buttoned and said barbs opening after penetration to act as a restraining means.

The buttons shown in FIGS. 1, 2, 3 or 4 and/or their restraining means may be jointed together in a line formation so that they are readily fed from a magazine to a buttoning position or magazine-fed buttoning gun as described in my co-pending United Kingdom Patent Applications 56396/72 and 56795/73.

I claim:

1. A buttoning means comprising in combination a pair of hollow tufting buttons at least one of which has an interior wall and each of which are provided with base plate members, said base plate members being provided with centrally disposed apertures capable of being aligned on opposite side portions of material to be tufted, a substantially rigid, elongated shank having a major portion extending to one end of uniform diameter slidably arranged in one of said apertures, a cord secured to one end of said shank and having an enlarged terminal portion positioned on one side of said apertured base plate member adjacent said interior wall, terminal portion being larger than said one aperture to prevent total removal of said cord, said shank means further including at its opposite free end a pointed end, adjacent said pointed end an abutment positioned outwardly from said shank having a greater transverse extent than said one aperture for permanent insertion in said aperture of said other button upon the pointed end end being forced through said material to be tufted, said major portion of said shank being movable completely out of said one aperture.

2. A buttoning means as claimed in claim 1 in which the said one aperture which is arranged to slidably support the said shank means includes a guideway means for orienting the said shank means in a predetermined direction toward the opposite side of the material to be tufted.

3. A buttoning means as claimed in claim 1 in which the shank means is of greater length than the distance from the base plate member to the interior wall of said one button.

* * * * *